(12) United States Patent
Shido

(10) Patent No.: US 12,036,779 B2
(45) Date of Patent: Jul. 16, 2024

(54) DECORATIVE LAMINATE

(71) Applicant: AICA KOGYO CO., LTD., Kiyosu (JP)

(72) Inventor: Kazuya Shido, Kiyosu (JP)

(73) Assignee: AICA KOGYO CO., LTD., Kiyosu (JP)

( * ) Notice: Subject to any disclaimer, the term of this patent is extended or adjusted under 35 U.S.C. 154(b) by 272 days.

(21) Appl. No.: 17/250,851

(22) PCT Filed: Jan. 29, 2019

(86) PCT No.: PCT/JP2019/003019
§ 371 (c)(1),
(2) Date: Mar. 12, 2021

(87) PCT Pub. No.: WO2020/054093
PCT Pub. Date: Mar. 19, 2020

(65) Prior Publication Data
US 2022/0105716 A1 Apr. 7, 2022

(30) Foreign Application Priority Data

Sep. 12, 2018 (JP) .................................. 2018-170501

(51) Int. Cl.
*B32B 29/02* (2006.01)
*B32B 5/02* (2006.01)
(Continued)

(52) U.S. Cl.
CPC .............. *B32B 29/02* (2013.01); *B32B 5/022* (2013.01); *B32B 5/266* (2021.05); *C08K 3/22* (2013.01);
(Continued)

(58) Field of Classification Search
CPC ......... B32B 29/02; B32B 5/022; B32B 5/266; B32B 2250/05; B32B 2260/023;
(Continued)

(56) References Cited

U.S. PATENT DOCUMENTS 6,333,280 B1 * 12/2001 Hashimoto ........... B44C 5/0423
442/247
2010/0136351 A1 * 6/2010 Iwasaki .................. B32B 5/022
428/524
(Continued)

FOREIGN PATENT DOCUMENTS

| CN | 1200078 A | 11/1998 |
|---|---|---|
| CN | 106163794 A | 11/2016 |

(Continued)

OTHER PUBLICATIONS

International Search Report from corresponding PCT Appln. No. PCT/JP2019/003019 dated Apr. 11, 2019.
(Continued)

*Primary Examiner* — Matthew D Matzek
(74) *Attorney, Agent, or Firm* — Grossman, Tucker, Perreault & Pfleger PLLC; Steven J. Grossman

(57) ABSTRACT

A decorative laminate of the present disclosure includes a decorative layer and a core layer. The decorative layer includes a decorative paper and a thermosetting resin. The core layer includes: a fibrous base material; an organic resin component; and an inorganic filler including endothermic metal hydroxide and/or an inorganic substance other than the endothermic metal hydroxide. The inorganic filler includes: a small particle diameter filler having a first average particle diameter; a medium particle diameter filler having a second average particle diameter larger than the first average particle diameter; and a large particle diameter (Continued)

filler having a third average particle diameter larger than the second average particle diameter.

16 Claims, 4 Drawing Sheets

(51) Int. Cl.
   *B32B 5/26* (2006.01)
   *C08K 3/22* (2006.01)
   *C08K 3/26* (2006.01)

(52) U.S. Cl.
   CPC ............ *C08K 3/26* (2013.01); *B32B 2250/05* (2013.01); *B32B 2260/023* (2013.01); *B32B 2260/028* (2013.01); *B32B 2260/046* (2013.01); *B32B 2262/101* (2013.01); *B32B 2264/102* (2013.01); *B32B 2307/3065* (2013.01); *B32B 2307/546* (2013.01); *B32B 2307/718* (2013.01); *B32B 2307/732* (2013.01); *B32B 2451/00* (2013.01); *C08K 2003/2227* (2013.01); *C08K 2003/265* (2013.01); *C08K 2201/005* (2013.01)

(58) Field of Classification Search
   CPC ........ B32B 2260/028; B32B 2260/046; B32B 2262/101; B32B 2307/546; B32B 2307/718; B32B 2307/732; B32B 2451/00; C08K 3/22; C08K 3/26; C08K 2003/2227; C08K 2003/265; C08K 2201/005
   USPC .......................................................... 442/59
   See application file for complete search history.

(56) References Cited

U.S. PATENT DOCUMENTS

| | | | |
|---|---|---|---|
| 2012/0177911 A1* | 7/2012 | Kimura | .................. C08J 5/244 428/323 |
| 2014/0242871 A1 | 8/2014 | Yasui et al. | |

FOREIGN PATENT DOCUMENTS

| | | |
|---|---|---|
| EP | 2767392 A1 | 8/2014 |
| JP | 2001-047588 | 2/2001 |
| JP | 2005-113036 | 4/2005 |
| JP | 2008-074943 | 4/2008 |
| JP | 2008-290444 | 12/2008 |
| JP | 2009-083337 | 4/2009 |
| JP | 2011-037040 | 2/2011 |
| JP | 2013099939 A | 5/2013 |
| JP | 5506277 B2 | 5/2014 |
| WO | WO-2016009573 A1 * | 1/2016 ............... B32B 5/18 |

OTHER PUBLICATIONS

Written Opinion from corresponding PCT Appln. No. PCT/JP2019/003019 dated Apr. 11, 2019.
Notification of Reason for Refusal dated on Mar. 29, 2022 in the corresponding Korean Patent Application No. 10-2021-7010526 and its machine-generated English translation. 13 pages.
Office Action from related Chinese Appln. No. 201980059763.4, dated Oct. 10, 2022. Machine generated, English translation attached.
Examination Report from related Indian Appln. No. 202117016560, mailed Nov. 29, 2021.
Extended European Search Report from related Application No. 19859614.0, mailed May 10, 2022. 9 pages.
Examination Report No. 1 for Australian Patent Application No. 2019340068, dated Aug. 18, 2023, 3 pages.

* cited by examiner

EXAMPLE 1

DECORATIVE LAMINATE

CROSS-REFERENCE TO RELATED APPLICATION

This international application claims the benefit of Japanese Patent Application No. 2018-170501 filed on Sep. 12, 2018 with the Japan Patent Office, and the disclosure of Japanese Patent Application No. 2018-170501 is incorporated herein by reference.

TECHNICAL FIELD

The present disclosure relates to a decorative laminate.

BACKGROUND ART

Thermosetting resin decorative laminates, such as melamine decorative laminates, are conventionally known as decorative laminates. The decorative laminates are widely used for residential equipment, interior materials (e.g., top boards and counters), and the like. Recently known is a decorative laminate imparted with fire retardant properties and non-combustibility (hereinafter referred to as a non-combustible decorative laminate). Such a decorative laminate comprises, as a core layer, a prepreg obtained by impregnating an inorganic fiber base material with a slurry containing a binder component such as a phenol-formaldehyde resin or a melamine-formaldehyde resin and an inorganic filler, and then drying the impregnated inorganic fiber base material (Patent Literature 1).

CITATION LIST

Patent Literature

PTL 1: Japanese Unexamined Patent Application Publication No. 2008-290444

SUMMARY OF INVENTION

Technical Problem

However, the non-combustible decorative laminate has restrictions on the amount of the binder component added, in order to ensure non-combustibility. If the amount of the binder component added is reduced, adhesion between the prepregs may become inferior. Moreover, since the blending ratio of the inorganic filler becomes relatively large, smoothness of the decorative laminate may become inferior. Furthermore, formation of the inorganic fiber base material is likely to appear on the surface of the decorative laminate, thus causing an orange peel state of the surface of the finished decorative laminate. Accordingly, further improvement of smoothness of the decorative laminate has been desired.

The present disclosure has been made in view of the foregoing, and provides a decorative laminate having non-combustibility and excellent smoothness.

Solution to Problem

A decorative laminate of the present disclosure comprises a decorative layer and a core layer. The decorative layer comprises a decorative paper and a thermosetting resin. The core layer comprises: a fibrous base material; an organic resin component; and an inorganic filler comprising endothermic metal hydroxide and/or an inorganic substance other than the endothermic metal hydroxide. The inorganic filler comprises: a small particle diameter filler having a first average particle diameter; a medium particle diameter filler having a second average particle diameter larger than the first average particle diameter; and a large particle diameter filler having a third average particle diameter larger than the second average particle diameter.

Advantageous Effects of Invention

The decorative laminate of the present disclosure has non-combustibility, and is excellent in smoothness.

DESCRIPTION OF EMBODIMENTS

Figure 1:
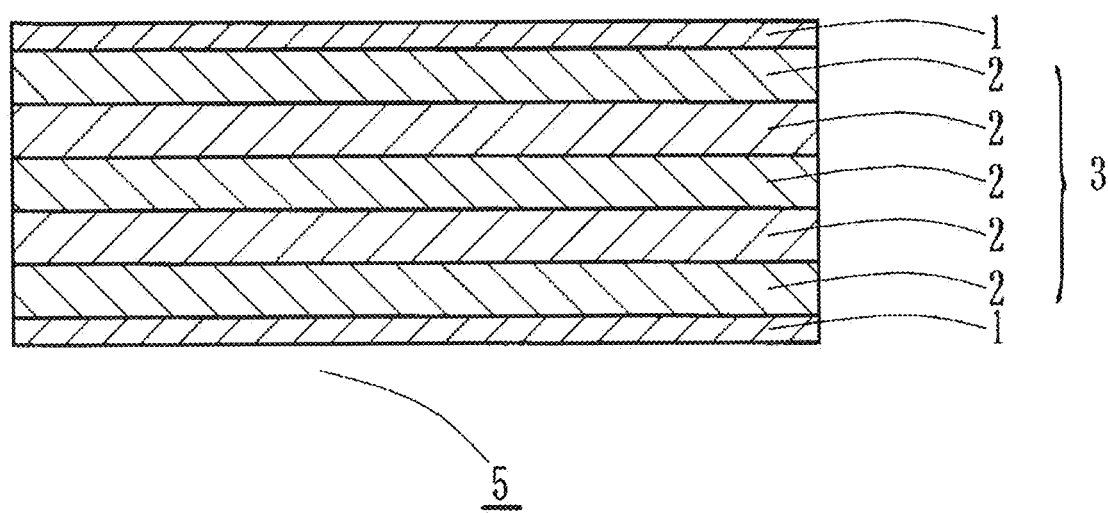
FIG. 1 is a sectional view showing a structure of a decorative laminate of Example 1 of the present disclosure.

Embodiments of the present disclosure will be described below.

A decorative laminate of the present disclosure comprises a decorative layer and a core layer.

(1) Decorative Layer

The decorative layer comprises decorative paper for a decorative laminate and a thermosetting resin. Examples of the decorative paper usable may include decorative paper of 30 to 140 g/m² for a thermosetting resin decorative laminate.

Examples of the thermosetting resin usable may include an amino-aldehyde resin, a diallyl phthalate resin, an unsaturated polyester resin, or a mixture resin thereof. Preferred among them is the amino-aldehyde resin, which is excellent in heat resistance, wear resistance, and so on. Particularly preferred is a melamine-aldehyde resin, which is excellent in water resistance, heat resistance, wear resistance, chemical resistance, and stain resistance.

The decorative layer can be produced by a method of, for example, impregnating the decorative paper with resin liquid mainly composed of the thermosetting resin and then drying the impregnated decorative paper. When the decorative paper is impregnated with the resin liquid and then the impregnated decorative paper is dried, the impregnation rate is preferably in the range of 30 to 300% as calculated by a calculation method shown by Formula 1. In Formula 1, "weight before impregnation" means the weight of the decorative paper, and "weight after impregnation" means the weight after the decorative paper is impregnated with the resin liquid and then the impregnated decorative paper is dried.

$$\text{Impregnation rate}_{(\%)} = \frac{\text{Weight after impregnation} - \text{Weight before impregnation}}{\text{Weight before impregnation}} \times 100 \quad \text{(Formula 1)}$$

(2) Core Layer

The decorative laminate of the present disclosure comprises a core layer. The core layer is configured with at least one prepreg containing a fibrous base material, (A) an organic resin component, and (B) an inorganic filler.

Examples of the fibrous base material may include nonwoven fabrics and woven fabrics. Examples of the fibrous base material may include an organic fiber base material and an inorganic fiber base material.

Examples of the organic fiber base material may include polyethylene, polypropylene, vinylon, polyvinyl chloride, polyvinylidene chloride, polyacrylonitrile, polyamide, polyester, polyurethane, modified products thereof, various copolymers typified by ethylene-vinyl acetate copolymer or the like, and mixtures thereof.

The fibrous base material may be the inorganic fiber base material. When a porous inorganic fiber base material is used as the fibrous base material, unevenness of formation of the inorganic fiber base material appears on a surface of the finished decorative laminate. Accordingly, the surface of the decorative laminate presents a so-called orange peel, and thus the inorganic fiber base material has been a base material difficult to deal with. However, smoothness of the decorative laminate is greatly improved by adjusting the density of the inorganic fiber base material, and the particle diameter and the blending ratio of the inorganic filler, to the ranges specified in the present disclosure.

Examples of the inorganic fiber base material may include nonwoven fabrics and woven fabrics. Examples of a preferred inorganic fiber base material may include glass fibers, rock wool, and carbon fibers.

The thickness of the inorganic fiber base material is preferably 0.01 to 2.0 mm, and more preferably 0.2 to 0.7 mm. The density of the inorganic fiber base material is preferably 0.01 to 1.0 g/cm$^3$, and more preferably 0.10 to 0.20 g/cm$^3$. The basis weight of the inorganic fiber base material is preferably 10 to 200 g/m$^2$, and more preferably 30 to 100 g/m$^2$. When the inorganic fiber base material satisfying these ranges is used, smoothness of the core layer is improved, appearance of the decorative laminate is improved, and impregnatability of a slurry is further improved.

Use of the inorganic fiber base material further improves non-combustibility of the decorative laminate as compared with a case of using the organic fiber base material. In particular, use of a glass fiber nonwoven fabric among the inorganic fiber base materials further improves heat resistance and flame resistance of the decorative laminate, and impregnatability of the slurry.

The fibrous base material is impregnated with a slurry containing (A) the organic resin component and (B) the inorganic filler. (A) the organic resin component functions as a binder component. Preferred as (A) the organic resin component is thermosetting resins, and preferred among them is a condensation-type thermosetting resin. Examples of the condensation-type thermosetting resin may include an amino-aldehyde resin and/or a phenol-aldehyde resin. The blending ratio of (A) the organic resin component to (B) the inorganic filler by solid weight is preferably 1:1-25, and more preferably 1:5-20. When the blending ratio of (A) the organic resin component to (B) the inorganic filler is in these ranges, adhesion between the decorative layer and the prepreg and/or between the prepregs is improved. Moreover, non-combustibility of the decorative laminate can be improved.

Examples of the applicable amino-aldehyde resin may include: an initial condensate obtained by reacting an amino compound, such as melamine, urea, benzoguanamine, and acetoguanamine, with aldehyde; a product obtained by etherifying the initial condensate with lower alcohol, such as methyl alcohol and butyl alcohol; a product obtained by modifying the initial condensate with a reactive modifier for promoting plasticization, such as p-toluenesulfonamide. Among them, an amino-formaldehyde resin is preferable, and a melamine-aldehyde resin excellent in durability is more preferable.

The phenol-aldehyde resin may be obtained by, for example, reacting phenols with aldehydes at a ratio of 1 mol of a phenolic hydroxyl group to 1 to 3 mol of aldehydes in the presence of basic catalyst or acidic catalyst. Examples of phenols may include phenol, cresol, xylenol, octylphenol, phenylphenol, bisphenol A, bisphenol S, and bisphenol F. Examples of aldehydes may include formaldehyde, paraformaldehyde, and glyoxal. Among the phenol-aldehyde resins, a phenol-formaldehyde resin is preferable. Also usable resin is a phenol-aldehyde resin modified as necessary with a modifier for promoting plasticization, such as urea, urea derivatives, p-toluenesulfonamide, tung oil, phosphate esters and glycols.

Examples of the basic catalyst used for synthesis of the phenol-aldehyde resin may include: metal oxide containing alkali metal (e.g., sodium, potassium, or the like), alkaline-earth metal (e.g., magnesium, calcium, or the like), and/or the like; metal hydroxide containing alkali metal (e.g., sodium, potassium, or the like), alkaline-earth metal (e.g., magnesium, calcium, or the like), and/or the like; amines such as triethylamine and triethanolamine; and ammonia. Examples of the acidic catalyst may include p-toluenesulfonic acid and hydrochloric acid.

The mass per unit area of (A) the organic resin component contained in each prepreg is preferably 30 to 100 g/m$^2$, and the mass per unit area of (A) the organic resin component contained in the core layer is preferably 40 to 500 g/m$^2$. When these ranges are satisfied, the decorative laminate is excellent in non-combustibility, and adhesion between the decorative layer and the prepreg and/or between the prepregs is good.

Examples of (B) the inorganic filler may include (b2) endothermic metal hydroxide and (b1) inorganic substance other than the endothermic metal hydroxide. These may be used alone or in combination. The endothermic metal hydroxide contains water of crystallization, and decomposes at high temperature to release water. Such reaction of decomposing to release water is an endothermic reaction. Thus, the core layer containing the endothermic metal hydroxide exerts an effect of reducing temperature rise in the decorative laminate during combustion to thereby improve non-combustibility of the decorative laminate.

The average particle diameter of the inorganic filler may be in the range of 0.04 μm or more and less than 50 μm. The average particle diameter larger in this range (e.g., 4 μm or more) is an arithmetic average diameter calculated based on the particle size distribution (volume distribution) detected by a laser diffraction/scattering method (Microtrac method). The average particle diameter smaller in this range (e.g., less than 4 μm) is obtained by measuring the particle diameters of 100 endothermic metal hydroxides with an electron microscope and averaging out the measured particle diameters.

Examples of the endothermic metal hydroxide may include aluminum hydroxide, magnesium hydroxide, and calcium hydroxide. In particular, aluminum hydroxide and magnesium hydroxide are preferable.

The average particle diameter of the endothermic metal hydroxide may be in the range of 0.04 µm or more and less than 50 µm. A method of measuring the average particle diameter of the endothermic metal hydroxide is similar to the method of measuring the average particle diameter of the inorganic filler.

When the average particle diameter of the endothermic metal hydroxide is in the above-specified range, dispersibility of the endothermic metal hydroxide in the slurry is improved, and impregnatability of the slurry into the fibrous base material is improved. Moreover, the finished surface of the decorative laminate is smooth.

Examples of the inorganic substance other than the endothermic metal hydroxide may include carbonate such as calcium carbonate, magnesium carbonate, and zinc carbonate, silica, talc, and fly ash. The average particle diameter of the inorganic substance other than the endothermic metal hydroxide may be in the range of 0.04 µm or more and less than 50 µm, similarly to that of the endothermic metal hydroxide. A method of measuring the average particle diameter of the inorganic substance other than the endothermic metal hydroxide is similar to the method of measuring the average particle diameter of the inorganic filler. When the average particle diameter is in this range, impregnatability of the slurry into the fibrous base material is further improved.

It is preferred that carbonate, talc, and particularly calcium carbonate be used together with the endothermic metal hydroxide, as the inorganic substance other than the endothermic metal hydroxide. This further improves workability and machinability in the production process of the decorative laminate.

When the endothermic metal hydroxide and the inorganic substance other than the endothermic metal hydroxide are used together, the blending ratio of the endothermic metal hydroxide to 1 part by weight of the inorganic substance other than the endothermic metal hydroxide is preferably 0.2 to 20 parts by weight, and more preferably 0.5 to 15 parts by weight. In these cases, a decorative laminate having a smooth and good surface appearance is obtained. Due to the blending ratio of the endothermic metal hydroxide being 0.2 parts by weight or more, non-combustibility of the decorative laminate is more excellent. The blending ratio of the endothermic metal hydroxide is preferably 20 parts by weight or less. In this case, sedimentation of the endothermic metal hydroxide in the slurry is unlikely to occur, thus facilitating control of the amount of impregnation of the slurry. Further, due to the blending ratio of the endothermic metal hydroxide being 20 parts by weight or less, wear of a cutter used for cutting the decorative laminate can be reduced.

Examples of the calcium carbonate usable may include heavy calcium carbonate and light calcium carbonate (precipitated calcium carbonate). Light calcium carbonate means calcium carbonate chemically produced by calcining limestone. Heavy calcium carbonate means pulverized calcium carbonate produced by dry or wet grinding white crystalline limestone.

Smoothness of the decorative laminate of the present disclosure is measured according to JIS B 0601:2013. Smoothness of the decorative laminate is measured in a direction parallel to a fiber direction (longitudinal direction) of the decorative laminate, and in a direction perpendicular to the fiber direction (transverse direction) of the decorative laminate. An arithmetic average waviness Wa in the waviness curve in the longitudinal direction of the decorative laminate of the present disclosure is preferably 0.120 µm or less. If specifically indicated as a range, it is preferably 0.02 to 0.11 µm, and more preferably 0.03 to 0.10 µm. A maximum sectional height Wt in the waviness curve in the longitudinal direction of the decorative laminate of the present disclosure is preferably 0.840 µm or less. If specifically indicated as a range, it is preferably 0.1 to 0.8 µm, and more preferably 0.2 to 0.8 µm.

An arithmetic average waviness Wa in the waviness curve in the transverse direction of the decorative laminate of the present disclosure is preferably 0.125 µm or less. If specifically indicated as a range, it is preferably 0.03 to 0.12 µm, and more preferably 0.04 to 0.11 µm. A maximum sectional height Wt in the waviness curve in the transverse direction of the decorative laminate of the present disclosure is preferably 1.0 µm or less. If specifically indicated as a range, it is preferably 0.1 to 1.0 µm, and more preferably 0.2 to 0.9 µm. In these cases, the orange peel on the surface of the decorative laminate is less conspicuous. As a result, the decorative laminate is smooth and has an improved appearance.

The bending strength and the modulus of elasticity of the decorative laminate of the present disclosure are measured according to JIS K 7171:2016. The thickness of the decorative laminate of the present disclosure is preferably 0.40 mm or more, and the bending strength thereof is preferably 30 to 300 MPa, and more preferably 50 to 130 MPa. The modulus of elasticity of the decorative laminate of the present disclosure is preferably 3 to 30 GPa, and more preferably 5 to 16 GPa. In these cases, a decorative laminate excellent in elasticity, strength, and handleability is obtained. The bending strength and the modulus of elasticity of the decorative laminate are measured in a direction perpendicular to the fiber direction of the decorative laminate.

In the present disclosure, the core layer contains (B) the inorganic filler. (B) the inorganic filler contains (b1) the inorganic substance other than the endothermic metal hydroxide and/or (b2) the endothermic metal hydroxide.

When the mass per unit area of (B) the inorganic filler contained in each prepreg forming the core layer is 300 to 1200 $g/m^2$, non-combustibility of the decorative laminate is excellent. Further, when the mass per unit area of (b1) the inorganic substance other than the endothermic metal hydroxide contained in each prepreg is 0 to 700 $g/m^2$ and the mass per unit area of (b2) the endothermic metal hydroxide contained in each prepreg is 0 to 1000 $g/m^2$, impregnatability of the prepreg, and smoothness and non-combustibility of the decorative laminate are excellent.

The inorganic filler of the present disclosure contains a small particle diameter filler having a first average particle diameter, a medium particle diameter filler having a second average particle diameter larger than the first average particle diameter, and a large particle diameter filler having a third average particle diameter larger than the second average particle diameter. The inorganic filler of the present disclosure contains at least the small particle diameter filler, the medium particle diameter filler, and the large particle diameter filler, and may further contain a filler having another average particle diameter. In these cases, the decorative laminate has excellent non-combustibility and smoothness.

The decorative laminate of the present disclosure has a sufficient non-combustibility also in a case where the core layer contains the inorganic substance other than the endothermic metal hydroxide instead of the endothermic metal hydroxide.

The second average particle diameter of the medium particle diameter filler and the third average particle diameter of the large particle diameter filler are arithmetic average diameters calculated based on the particle size distribution (volume distribution) detected by a laser diffraction/scattering method (Microtrac method). The first average particle diameter of the small particle diameter filler is obtained by measuring the particle diameters of 100 particles of the inorganic filler with an electron microscope and averaging out the measured particle diameters.

Preferably, the first average particle diameter of the small particle diameter filler is 0.04 μm or more and less than 4 μm, the second average particle diameter of the medium particle diameter filler is 4 μm or more and less than 12 μm, and the third average particle diameter of the large particle diameter filler is 12 μm or more and less than 50 μm. The small particle diameter filler, the medium particle diameter filler, and the large particle diameter filler may be the same substance or may be different from each other.

The blending mass ratio of the small particle diameter filler to the medium particle diameter filler to the large particle diameter filler is preferably 1:0.1-20:0.1-20, and more preferably 1:0.1-10:0.1-10. When the blending mass ratio of the small particle diameter filler, the medium particle diameter filler, and the large particle diameter filler is in these ranges, a decorative laminate excellent in both smoothness and non-combustibility is obtained.

Figure 3:
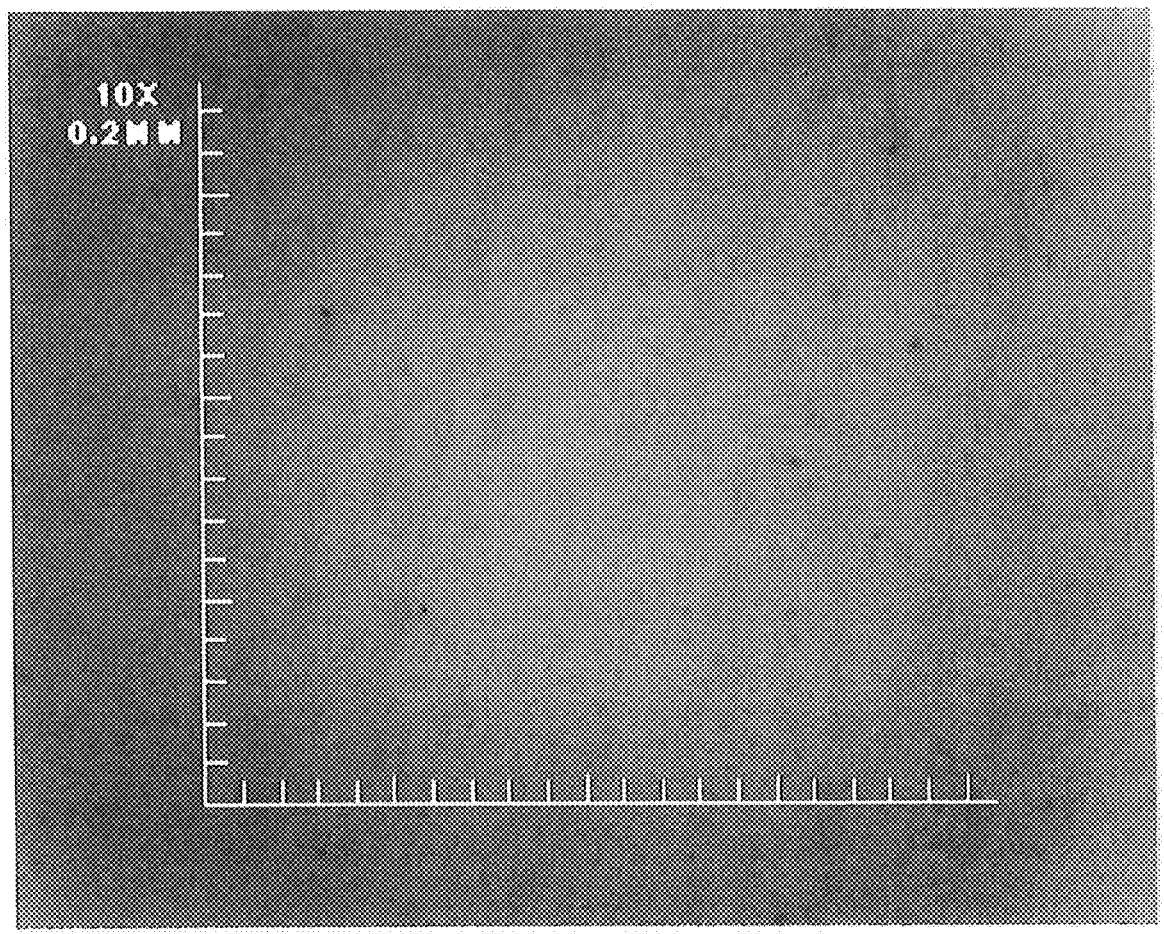
FIG. 3 is a photograph of a prepreg of Example 1 of the present disclosure taken by a digital microscope (manufactured by Fujidenshi Corp., Model No.: FTG40, at a magnification of ×10).
Figure 4:
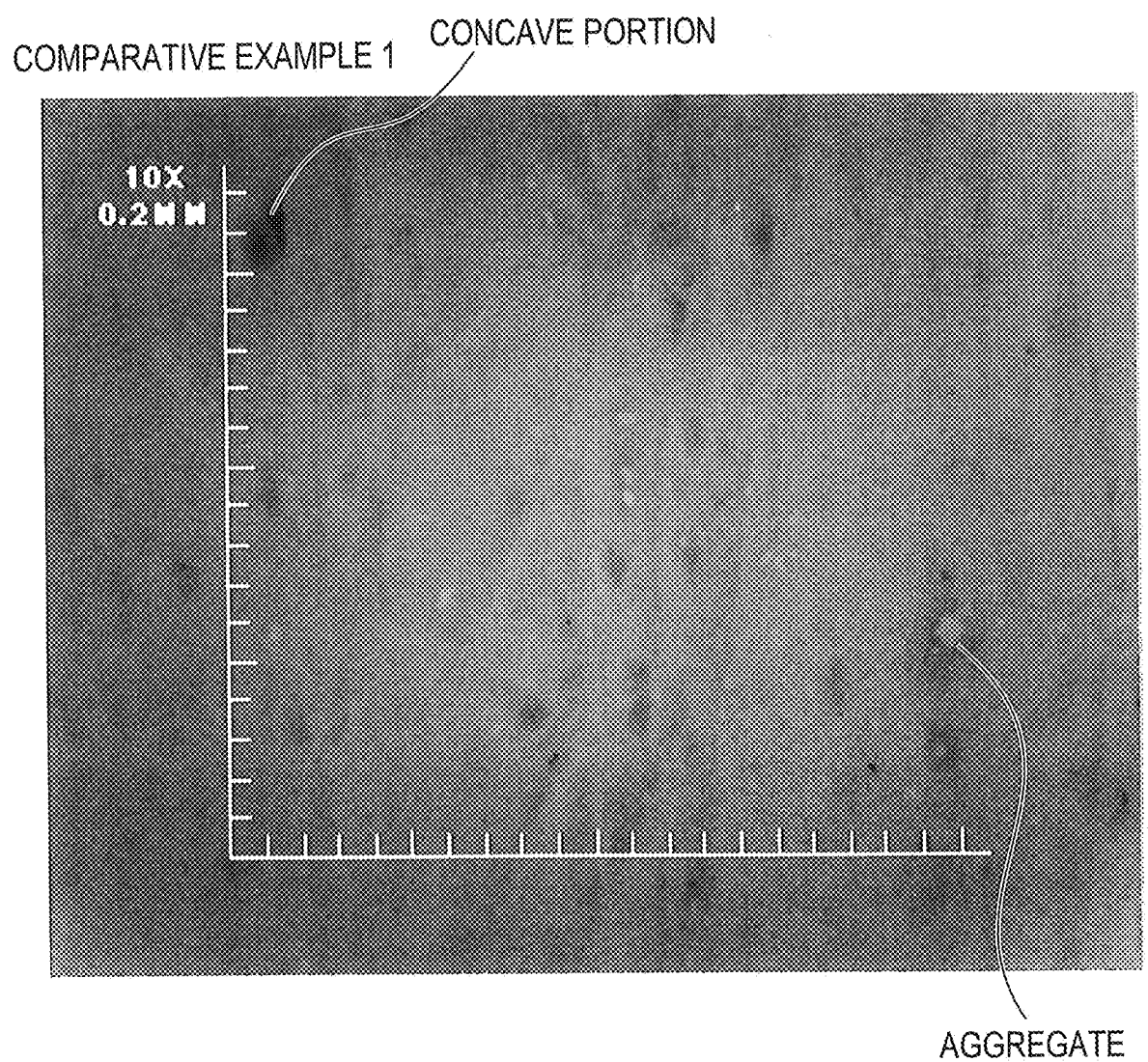
FIG. 4 is a photograph of a prepreg of Comparative Example 1 taken by the digital microscope (manufactured by Fujidenshi Corp., Model No.: FTG40, at a magnification of ×10).

FIG. 3 is a photograph of a prepreg of Example 1 of the present disclosure taken by a digital microscope. FIG. 4 is a photograph of a prepreg of Comparative Example 1 of the present disclosure taken by a digital microscope. The prepreg of Example 1 is smoother than the prepreg of Comparative Example 1. The reason is considered to be as follows. In the prepreg of Example 1, the inorganic filler is considered to be uniformly dispersed on the surface of the nonwoven fabric or to have entered gaps between fibers of the nonwoven fabric. Moreover, the fibrous base material is an aggregate of fibers in which short fibers of the nonwoven fabric are dispersed one by one and entwined thermally or mechanically with the binder component. Thus, the fibrous base material is more porous than kraft paper used as core paper for usual decorative laminates, thus having sparse parts, that is, so-called voids. Such voids are not uniform in size and have various sizes. When the inorganic filler containing the above-described small particle diameter filler, medium particle diameter filler, and large particle diameter filler each having a different average particle diameter is used, the binder component contained in the nonwoven fabric and the binder component composed of the thermosetting resin contained in the slurry flow much into lower voids during hot pressing. In particular, thermoplastic resin emulsion easily softens as compared with the thermosetting resin contained in the slurry. Thus, when the thermoplastic resin emulsion is used as the binder component in the production process of the nonwoven fabric, binding of the entangled fibers is weakened. The inorganic filler easily enters the voids in the nonwoven fabric during hot pressing, and fills the voids densely. As a result, smoothness of the finished decorative laminate is improved.

The volume cumulative particle diameters Dv(10) and Dv(90) of the inorganic filler measured by a laser diffraction/scattering-type particle size distribution measurement method are preferably 0.2 μm or more and 45.0 μm or less, and more preferably 0.5 μm or more and 40.0 μm or less. When the volume cumulative particle diameters of the inorganic filler containing three types of fillers, namely, the small particle diameter filler, the medium particle diameter filler, and the large particle diameter filler are in these ranges, dispersibility of the inorganic filler in the slurry is good, the voids in the nonwoven fabric are densely filled, and smoothness of the decorative laminate is improved.

The specific surface area of the inorganic filler according to the laser diffraction/scattering-type particle size distribution measurement method is preferably 800 to 4000 $m^2/kg$, and more preferably 900 to 3500 $m^2/kg$. When the specific surface area of the inorganic filler is in these ranges, the inorganic filler easily adsorbs the thermosetting resin in the slurry. While flowing, the thermosetting resin enters the voids in the nonwoven fabric, thus contributing to improved adhesion between the prepregs. As described so far, selection of the inorganic filler having an appropriate particle diameter according to the thickness and density of the nonwoven fabric to be used results in a decorative laminate having excellent smoothness and high adhesion as compared with conventional ones.

In the inorganic filler containing the large particle diameter filler, the medium particle diameter filler, and the small particle diameter filler, it is preferred to use calcium carbonate as the small particle diameter filler. This reduces aggregation of the inorganic filler in the slurry, and improves impregnatability of the slurry into the fibrous base material. Furthermore, the calcium carbonate is preferred because it is available inexpensively.

The mass per unit area of (B) the inorganic filler contained in the core layer is preferably 500 to 6000 $g/m^2$, and the percentage of the small particle diameter filler in (B) the inorganic filler is preferably 5 to 60% by weight. When these ranges are satisfied, a decorative laminate excellent in non-combustibility and smoothness is obtained.

In the core layer, the ratio of the total mass [$g/m^2$] of (A) the organic resin component and (B) the inorganic filler to the mass [$g/m^2$] of the fibrous base material is preferably 1 to 0.3 or more and 200 or less, and more preferably 1 to 0.7 or more and 150 or less. In these cases, a decorative laminate excellent in non-combustibility and smoothness can be obtained.

The decorative laminate of the present disclosure may be produced by, for example, stacking the core layer and the decorative layer, and hot pressing such a stack with a pressing machine, such as a flat press or a continuous press. The decorative laminate may have a decorative layer on its one side, or may have decorative layers on its both sides.

The present disclosure will be described in detail below with reference to examples and comparative examples. These are examples for facilitating understanding of the present disclosure, and the present disclosure is not limited by these examples.

Example 1

FIG. 1 is a sectional view of a decorative laminate 5 of Example 1. The decorative laminate 5 of Example 1 comprises a core layer 3 comprising five prepregs 2, and decorative layers 1, 1 provided on both the front and back sides of the core layer 3.

Decorative Layer

Plain decorative paper having the basis weight of 100 g/m² was impregnated with resin liquid mainly composed of melamine-formaldehyde resin such that the impregnation rate as defined by the foregoing Formula 1 was 120% to obtain melamine resin-impregnated decorative paper.

Prepreg for Core Layer

A glass fiber nonwoven fabric containing thermoplastic resin emulsion as a binder component was prepared. The basis weight of the glass fiber nonwoven fabric was 53 g/m². The thickness of the glass fiber nonwoven fabric was 0.405 mm, and the density thereof was 0.121 g/cm³.

The following components were mixed to obtain a slurry.
- 4.5 parts by mass in solid content (hereinafter simply referred to as "parts") of phenol-formaldehyde resin
- 3.5 parts of melamine-formaldehyde resin
- 16.5 parts of calcium carbonate having the average particle diameter of 1.4 μm as measured with an electron microscope, as a small particle diameter filler
- 37.5 parts of aluminum hydroxide having the average particle diameter of 8 μm as determined by a laser diffraction/scattering method, as a medium particle diameter filler
- 37.5 parts of aluminum hydroxide having the average particle diameter of 20 μm as determined by a laser diffraction/scattering method, as a large particle diameter filler The slurry was impregnated into the glass fiber nonwoven fabric such that the impregnation rate as defined by Formula 1 was 1200% to obtain a prepreg.

Decorative Laminate

One sheet of the melamine resin-impregnated decorative paper, five prepregs, and one sheet of the melamine resin-impregnated decorative paper were stacked in this order from below, and then such a stack was hot pressed with plates for flat finish using a flat pressing machine, under the conditions: temperature of 132° C., pressure of 70 kgf/cm², and time period of 64 minutes, to obtain the decorative laminate of Example 1.

Example 2

A decorative laminate was produced in the same manner as in Example 1, except that the slurry used contained the following components as the inorganic filler of the prepreg.
- 16.5 parts of the calcium carbonate having the average particle diameter of 1.4 μm
- 37.5 parts of calcium carbonate having the average particle diameter of 8 μm
- 37.5 parts of calcium carbonate having the average particle diameter of 17 μm Example 3

A decorative laminate was produced in the same manner as in Example 1, except that the slurry used contained the following components as the inorganic filler of the prepreg.
- 16.5 parts of aluminum hydroxide having the average particle diameter of 1.0 μm
- 37.5 parts of the aluminum hydroxide having the average particle diameter of 8 μm
- 37.5 parts of the aluminum hydroxide having the average particle diameter of 20 μm Example 4

A decorative laminate was produced in the same manner as in Example 2, except that the binder components of the prepreg were 0 part of the phenol-formaldehyde resin and 8 parts of the melamine-formaldehyde resin.

Example 5

A decorative laminate was produced in the same manner as in Example 2, except that the binder components of the prepreg were 8 parts of the phenol-formaldehyde resin and 0 part of the melamine-formaldehyde resin.

Example 6

A decorative laminate was produced in the same manner as in Example 3, except that the binder components of the prepreg were 0 part of the phenol-formaldehyde resin and 8 parts of the melamine-formaldehyde resin.

Example 7

A decorative laminate was produced in the same manner as in Example 3, except that the binder components of the prepreg were 8 parts of the phenol-formaldehyde resin and 0 part of the melamine-formaldehyde resin.

Example 8

A decorative laminate was produced in the same manner as in Example 1, except that the binder components of the prepreg were 0 part of the phenol-formaldehyde resin and 8 parts of the melamine-formaldehyde resin.

Example 9

A decorative laminate was produced in the same manner as in Example 1, except that the binder components of the prepreg were 8 parts of the phenol-formaldehyde resin and 0 part of the melamine-formaldehyde resin.

Example 10

A decorative laminate was produced in the same manner as in Example 1, except that a glass fiber nonwoven fabric having the basis weight of 35 g/m² (binder component: thermoplastic resin emulsion, thickness: 0.210 mm, density: 0.180 g/cm³) was used instead of the glass fiber nonwoven fabric having the basis weight of 53 g/m².

Example 11

A decorative laminate was produced in the same manner as in Example 1, except that a glass fiber nonwoven fabric having the basis weight of 96 g/m² (binder component: thermoplastic resin emulsion, thickness: 0.664 mm, density: 0.141 g/cm³) was used instead of the glass fiber nonwoven fabric having the basis weight of 53 g/m².

Example 12

A decorative laminate was produced in the same manner as in Example 1, except that the number of the prepregs used was one.

Example 13

A decorative laminate was produced in the same manner as in Example 1, except that the number of the prepregs used was eight.

Example 14

A decorative laminate was produced in the same manner as in Example 1, except that a glass fiber nonwoven fabric having the basis weight of 76 g/m² (binder component: thermoplastic resin emulsion, thickness: 0.585 mm, density: 0.130 g/cm³) was used instead of the glass fiber nonwoven fabric having the basis weight of 53 g/m².

Example 15

A decorative laminate was produced in the same manner as in Example 1, except that the glass fiber nonwoven fabric having the basis weight of 96 g/m² (binder component: thermoplastic resin emulsion, thickness: 0.664 mm, density: 0.141 g/cm³) was used instead of the glass fiber nonwoven fabric having the basis weight of 53 g/m² and that the number of the prepregs used was four.

Example 16

A decorative laminate was produced in the same manner as in Example 1, except that the binder components were 3 parts of the phenol-formaldehyde resin and 2 parts of the melamine-formaldehyde resin.

Example 17

A decorative laminate was produced in the same manner as in Example 1, except that the binder components were 9 parts of the phenol-formaldehyde resin and 7 parts of the melamine-formaldehyde resin.

Example 18

A decorative laminate was produced in the same manner as in Example 1, except that the amount of the aluminum hydroxide having the average particle diameter of 8 μm was 5 parts and the amount of the aluminum hydroxide having the average particle diameter of 20 μm was 70 parts.

Example 19

A decorative laminate was produced in the same manner as in Example 1, except that the amount of the aluminum hydroxide having the average particle diameter of 8 μm was 70 parts and the amount of the aluminum hydroxide having the average particle diameter of 20 μm was 5 parts.

Example 20

A decorative laminate was produced in the same manner as in Example 1, except that the amount of the calcium carbonate having the average particle diameter of 1.4 μm was 6.5 parts, the amount of the aluminum hydroxide having the average particle diameter of 8 μm was 42.5 parts, and the amount of the aluminum hydroxide having the average particle diameter of 20 μm was 42.5 parts.

Example 21

A decorative laminate was produced in the same manner as in Example 1, except that the amount of the calcium carbonate having the average particle diameter of 1.4 μm was 51.5 parts, the amount of the aluminum hydroxide having the average particle diameter of 8 μm was 20 parts, and the amount of the aluminum hydroxide having the average particle diameter of 20 μm was 20 parts.

Example 22

A decorative laminate was produced in the same manner as in Example 2, except that 37.5 parts of talc (manufactured by Fuji Talc Industrial Co., Ltd., product name: RS515) having the average particle diameter of 15 μm was used instead of 37.5 parts of the calcium carbonate having the average particle diameter of 17 μm.

Example 23

A decorative laminate was produced in the same manner as in Example 3, except that the slurry used contained the following components as the inorganic filler.
  6.5 parts of the aluminum hydroxide having the average particle diameter of 1.0 μm
  42.5 parts of the aluminum hydroxide having the average particle diameter of 8 μm
  42.5 parts of the aluminum hydroxide having the average particle diameter of 20 μm

Example 24

A decorative laminate was produced in the same manner as in Example 3, except that the slurry used contained the following components as the inorganic filler.
  51.5 parts of the aluminum hydroxide having the average particle diameter of 1.0 μm
  20 parts of the aluminum hydroxide having the average particle diameter of 8 μm
  20 parts of the aluminum hydroxide having the average particle diameter of 20 μm

Example 25

A decorative laminate was produced in the same manner as in Example 2, except that the slurry used contained the following components as the inorganic filler.
  6.5 parts of the calcium carbonate having the average particle diameter of 1.4 μm
  42.5 parts of the calcium carbonate having the average particle diameter of 8 μm
  42.5 parts of the calcium carbonate having the average particle diameter of 17 μm

Example 26

A decorative laminate was produced in the same manner as in Example 2, except that the slurry used contained the following components as the inorganic filler.
  51.5 parts of the calcium carbonate having the average particle diameter of 1.4 μm
  20 parts of the calcium carbonate having the average particle diameter of 8 μm
  20 parts of the calcium carbonate having the average particle diameter of 17 μm

Example 27

A decorative laminate was produced in the same manner as in Example 12, except that a glass fiber nonwoven fabric having the basis weight of 40 g/m² (binder component: thermoplastic resin emulsion, thickness: 0.310 mm, density:

0.128 g/cm³) was used instead of the glass fiber nonwoven fabric having the basis weight of 53 g/m². The number of the prepregs used was one.

Comparative Example 1

A decorative laminate was produced in the same manner as in Example 1, except that the slurry used contained the following components.
4.5 parts of the phenol-formaldehyde resin
3.5 parts of the melamine-formaldehyde resin
16.5 parts of calcium carbonate having the average particle diameter of 1.8 μm
75 parts of aluminum hydroxide having the average particle diameter of 12 μm Comparative Example 2

A decorative laminate was produced in the same manner as in Example 5, except that the slurry used contained the following components as (B) the inorganic filler.
50 parts of calcium carbonate having the average particle diameter of 10 μm
50 parts of calcium carbonate having the average particle diameter of 80 μm The calcium carbonate having the average particle diameter of 10 μm corresponds to the medium particle diameter filler of the present disclosure, and the calcium carbonate having the average particle diameter of 80 μm corresponds to an extra-large particle diameter filler.

Comparative Example 3

A decorative laminate was produced in the same manner as in Comparative Example 2, except that 50 parts of the aluminum hydroxide having the average particle diameter of 8 μm and 50 parts of the aluminum hydroxide having the average particle diameter of 20 μm were blended instead of the calcium carbonates, and that the glass fiber nonwoven fabric having the basis weight of 76 g/m² was used instead of the glass fiber nonwoven fabric having the basis weight of 53 g/m².

Table 1-1 and Table 1-2 show the blending ratios of the slurries. The numerical values represent parts by mass in solid content.

TABLE 1-1

| | (A) Organic resin component | | (B) Inorganic filler | | | | | | |
| | | | (b1) Inorganic substance other than endothermic metal hydroxide | | | | (b2) Endothermic metal hydroxide | | |
| | Phenol-formaldehyde resin | Melamine-formaldehyde resin | Small particle diameter filler | Medium particle diameter filler | Large particle diameter filler | Extra-large particle diameter filler | Small particle diameter filler | Medium particle diameter filler | Large particle diameter filler |
|---|---|---|---|---|---|---|---|---|---|
| Example 1 | 4.5 | 3.5 | 16.5 | 0 | 0 | 0 | 0 | 37.5 | 37.5 |
| Example 2 | 4.5 | 3.5 | 16.5 | 37.5 | 37.5 | 0 | 0 | 0 | 0 |
| Example 3 | 4.5 | 3.5 | 0 | 0 | 0 | 0 | 16.5 | 37.5 | 37.5 |
| Example 4 | 0 | 8 | 16.5 | 37.5 | 37.5 | 0 | 0 | 0 | 0 |
| Example 5 | 8 | 0 | 16.5 | 37.5 | 37.5 | 0 | 0 | 0 | 0 |
| Example 6 | 0 | 8 | 0 | 0 | 0 | 0 | 16.5 | 37.5 | 37.5 |
| Example 7 | 8 | 0 | 0 | 0 | 0 | 0 | 16.5 | 37.5 | 37.5 |
| Example 8 | 0 | 8 | 16.5 | 0 | 0 | 0 | 0 | 37.5 | 37.5 |
| Example 9 | 8 | 0 | 16.5 | 0 | 0 | 0 | 0 | 37.5 | 37.5 |
| Example 10 | 4.5 | 3.5 | 16.5 | 0 | 0 | 0 | 0 | 37.5 | 37.5 |
| Example 11 | 4.5 | 3.5 | 16.5 | 0 | 0 | 0 | 0 | 37.5 | 37.5 |
| Example 12 | 4.5 | 3.5 | 16.5 | 0 | 0 | 0 | 0 | 37.5 | 37.5 |
| Example 13 | 4.5 | 3.5 | 16.5 | 0 | 0 | 0 | 0 | 37.5 | 37.5 |
| Example 14 | 4.5 | 3.5 | 16.5 | 0 | 0 | 0 | 0 | 37.5 | 37.5 |
| Example 15 | 4.5 | 3.5 | 16.5 | 0 | 0 | 0 | 0 | 37.5 | 37.5 |

TABLE 1-2

| | (A) Organic resin component | | (B) Inorganic filler | | | | | | |
| | | | (b1) Inorganic substance other than endothermic metal hydroxide | | | | (b2) Endothermic metal hydroxide | | |
| | Phenol-formaldehyde resin | Melamine-formaldehyde resin | Small particle diameter filler | Medium particle diameter filler | Large particle diameter filler | Extra-large particle diameter filler | Small particle diameter filler | Medium particle diameter filler | Large particle diameter filler |
|---|---|---|---|---|---|---|---|---|---|
| Example 16 | 3 | 2 | 16.5 | 0 | 0 | 0 | 0 | 37.5 | 37.5 |
| Example 17 | 9 | 7 | 16.5 | 0 | 0 | 0 | 0 | 37.5 | 37.5 |
| Example 18 | 4.5 | 3.5 | 16.5 | 0 | 0 | 0 | 0 | 5 | 70 |
| Example 19 | 4.5 | 3.5 | 16.5 | 0 | 0 | 0 | 0 | 70 | 5 |
| Example 20 | 4.5 | 3.5 | 6.5 | 0 | 0 | 0 | 0 | 42.5 | 42.5 |
| Example 21 | 4.5 | 3.5 | 51.5 | 0 | 0 | 0 | 0 | 20 | 20 |
| Example 22 | 4.5 | 3.5 | 16.5 | 37.5 | 37.5 | 0 | 0 | 0 | 0 |
| Example 23 | 4.5 | 3.5 | 0 | 0 | 0 | 0 | 6.5 | 42.5 | 42.5 |
| Example 24 | 4.5 | 3.5 | 0 | 0 | 0 | 0 | 51.5 | 20 | 20 |

TABLE 1-2-continued

| | (A) Organic resin component | | (B) Inorganic filler | | | | | | |
|---|---|---|---|---|---|---|---|---|---|
| | | | (b1) Inorganic substance other than endothermic metal hydroxide | | | | (b2) Endothermic metal hydroxide | | |
| | Phenol-formal-dehyde resin | Melamine-formal-dehyde resin | Small particle diameter filler | Medium particle diameter filler | Large particle diameter filler | Extra-large particle diameter filler | Small particle diameter filler | Medium particle diameter filler | Large particle diameter filler |
| Example 25 | 4.5 | 3.5 | 6.5 | 42.5 | 42.5 | 0 | 0 | 0 | 0 |
| Example 26 | 4.5 | 3.5 | 51.5 | 20 | 20 | 0 | 0 | 0 | 0 |
| Example 27 | 4.5 | 3.5 | 16.5 | 0 | 0 | 0 | 0 | 37.5 | 37.5 |
| Comparative Example 1 | 4.5 | 3.5 | 16.5 | 0 | 0 | 0 | 0 | 0 | 75 |
| Comparative Example 2 | 8 | 0 | 0 | 50 | 0 | 50 | 0 | 0 | 0 |
| Comparative Example 3 | 8 | 0 | 0 | 0 | 0 | 0 | 0 | 50 | 50 |

Table 2-1 and Table 2-2 show: the blending ratio of (B) the inorganic filler to (A) the organic resin component; the blending ratio of the small particle diameter filler to the medium particle diameter filler to the large particle diameter filler; the total mass of (A) and (B); the total mass of (b1) the inorganic substance other than the endothermic metal hydroxide; the total mass of (b2) the endothermic metal hydroxide; (b2)/(b1); the basis weight of the fibrous base material; the number of the prepregs; and the total basis weight of the fibrous base material.

TABLE 2-1

| | (B)/(A) | Blending ratio of small-, medium-, large- particle diameter fillers | (A) + (B) g | (b1) g | (b2) g | (b2)/(b1) — | Basis weight of fibrous base material [g/m$^2$] | Number of prepregs — | Total basis weight of fibrous base material [g/m$^2$] |
|---|---|---|---|---|---|---|---|---|---|
| Example 1 | 11.4 | 1:2.3:2.3 | 99.5 | 16.5 | 75 | 4.5 | 53 | 5 | 265 |
| Example 2 | 11.4 | 1:2.3:2.3 | 99.5 | 91.5 | 0 | 0.0 | 53 | 5 | 265 |
| Example 3 | 11.4 | 1:2.3:2.3 | 99.5 | 0 | 91.5 | — | 53 | 5 | 265 |
| Example 4 | 11.4 | 1:2.3:2.3 | 99.5 | 91.5 | 0 | 0.0 | 53 | 5 | 265 |
| Example 5 | 11.4 | 1:2.3:2.3 | 99.5 | 91.5 | 0 | 0.0 | 53 | 5 | 265 |
| Example 6 | 11.4 | 1:2.3:2.3 | 99.5 | 0 | 91.5 | — | 53 | 5 | 265 |
| Example 7 | 11.4 | 1:2.3:2.3 | 99.5 | 0 | 91.5 | — | 53 | 5 | 265 |
| Example 8 | 11.4 | 1:2.3:2.3 | 99.5 | 16.5 | 75 | 4.5 | 53 | 5 | 265 |
| Example 9 | 11.4 | 1:2.3:2.3 | 99.5 | 16.5 | 75 | 4.5 | 53 | 5 | 265 |
| Example 10 | 11.4 | 1:2.3:2.3 | 99.5 | 16.5 | 75 | 4.5 | 35 | 5 | 175 |
| Example 11 | 11.4 | 1:2.3:2.3 | 99.5 | 16.5 | 75 | 4.5 | 96 | 5 | 480 |
| Example 12 | 11.4 | 1:2.3:2.3 | 99.5 | 16.5 | 75 | 4.5 | 53 | 1 | 53 |
| Example 13 | 11.4 | 1:2.3:2.3 | 99.5 | 16.5 | 75 | 4.5 | 53 | 8 | 424 |
| Example 14 | 11.4 | 1:2.3:2.3 | 99.5 | 16.5 | 75 | 4.5 | 76 | 5 | 380 |
| Example 15 | 11.4 | 1:2.3:2.3 | 99.5 | 16.5 | 75 | 4.5 | 96 | 4 | 384 |

TABLE 2-2

| | (B)/(A) | Blending ratio of small-, medium-, large- particle diameter fillers | (A) + (B) g | (b1) g | (b2) g | (b2)/(b1) — | Basis weight of fibrous base material [g/m$^2$] | Number of prepregs — | Total basis weight of fibrous base material [g/m$^2$] |
|---|---|---|---|---|---|---|---|---|---|
| Example 16 | 18.3 | 1:2.3:2.3 | 96.5 | 16.5 | 75 | 4.5 | 53 | 5 | 265 |
| Example 17 | 5.7 | 1:2.3:2.3 | 107.5 | 16.5 | 75 | 4.5 | 53 | 5 | 265 |
| Example 18 | 11.4 | 1:0.3:4.2 | 99.5 | 16.5 | 75 | 4.5 | 53 | 5 | 265 |
| Example 19 | 11.4 | 1:4.2:0.3 | 99.5 | 16.5 | 75 | 4.5 | 53 | 5 | 265 |
| Example 20 | 11.4 | 1:6.5:6.5 | 99.5 | 6.5 | 85 | 13.1 | 53 | 5 | 265 |
| Example 21 | 11.4 | 1:0.4:0.4 | 99.5 | 51.5 | 40 | 0.8 | 53 | 5 | 265 |
| Example 22 | 11.4 | 1:2.3:2.3 | 99.5 | 91.5 | 0 | 0.0 | 53 | 5 | 265 |
| Example 23 | 11.4 | 1:6.5:6.5 | 99.5 | 0 | 91.5 | 0.0 | 53 | 5 | 265 |
| Example 24 | 11.4 | 1:0.4:0.4 | 99.5 | 91.5 | 0 | 0.0 | 53 | 5 | 265 |
| Example 25 | 11.4 | 1:6.5:6.5 | 99.5 | 91.5 | 0 | 0.0 | 53 | 5 | 265 |
| Example 26 | 11.4 | 1:0.4:0.4 | 99.5 | 16.5 | 75 | 0.0 | 53 | 5 | 265 |

TABLE 2-2-continued

|  | (B)/(A) | Blending ratio of small-, medium-, large- particle diameter fillers | (A) + (B) g | (b1) g | (b2) g | (b2)/(b1) — | Basis weight of fibrous base material [g/m²] | Number of prepregs — | Total basis weight of fibrous base material [g/m²] |
|---|---|---|---|---|---|---|---|---|---|
| Example 27 | 11.4 | 1:2.3:2.3 | 99.5 | 16.5 | 75 | 4.5 | 40 | 1 | 40 |
| Comparative Example 1 | 11.4 | 1:0:4.5 | 99.5 | 16.5 | 75 | 4.5 | 53 | 5 | 265 |
| Comparative Example 2 | 12.5 | — | 108 | 100 | 0 | 0.0 | 53 | 5 | 265 |
| Comparative Example 3 | 12.5 | — | 108 | 0 | 100 | - | 76 | 5 | 380 |

Table 3-1 and Table 3-2 show: the mass per m² of each of the small particle diameter filler, the medium particle diameter filler, the large particle diameter filler, and the extra-large particle diameter filler in (b1) the inorganic substance other than the endothermic metal hydroxide per prepreg; the total mass thereof; and the mass per unit area of (b1) the inorganic substance other than the endothermic metal hydroxide in the core layer.

TABLE 3-1

| | Mass per m² of (b1) per prepreg | | | | | |
|---|---|---|---|---|---|---|
| | Small particle diameter filler | Medium particle diameter filler | Large particle diameter filler | Extra-large particle diameter filler | Total [g/m²] | Mass of (b1) in core layer [g/m²] |
| Example 1 | 105.5 | 0.0 | 0.0 | 0.0 | 105.5 | 527.3 |
| Example 2 | 105.5 | 239.7 | 239.7 | 0.0 | 584.9 | 2,924.3 |
| Example 3 | 0.0 | 0.0 | 0.0 | 0.0 | 0.0 | 0.0 |
| Example 4 | 105.5 | 239.7 | 239.7 | 0.0 | 584.9 | 2,924.3 |
| Example 5 | 105.5 | 239.7 | 239.7 | 0.0 | 584.9 | 2,924.3 |
| Example 6 | 0.0 | 0.0 | 0.0 | 0.0 | 0.0 | 0.0 |
| Example 7 | 0.0 | 0.0 | 0.0 | 0.0 | 0.0 | 0.0 |
| Example 8 | 105.5 | 0.0 | 0.0 | 0.0 | 105.5 | 527.3 |
| Example 9 | 105.5 | 0.0 | 0.0 | 0.0 | 105.5 | 527.3 |
| Example 10 | 69.6 | 0.0 | 0.0 | 0.0 | 69.6 | 348.2 |
| Example 11 | 191.0 | 0.0 | 0.0 | 0.0 | 191.0 | 955.2 |
| Example 12 | 105.5 | 0.0 | 0.0 | 0.0 | 105.5 | 105.5 |
| Example 13 | 105.5 | 0.0 | 0.0 | 0.0 | 105.5 | 843.7 |
| Example 14 | 151.2 | 0.0 | 0.0 | 0.0 | 151.2 | 756.2 |
| Example 15 | 191.0 | 0.0 | 0.0 | 0.0 | 191.0 | 764.1 |

TABLE 3-2

| | Mass per m² of (b1) per prepreg | | | | | |
|---|---|---|---|---|---|---|
| | Small particle diameter filler | Medium particle diameter filler | Large particle diameter filler | Extra-large particle diameter filler | Total [g/m²] | Mass of (b1) in core layer [g/m²] |
| Example 16 | 108.7 | 0.0 | 0.0 | 0.0 | 108.7 | 543.7 |
| Example 17 | 97.6 | 0.0 | 0.0 | 0.0 | 97.6 | 488.1 |
| Example 18 | 105.5 | 0.0 | 0.0 | 0.0 | 105.5 | 527.3 |
| Example 19 | 105.5 | 0.0 | 0.0 | 0.0 | 105.5 | 527.3 |
| Example 20 | 41.5 | 0.0 | 0.0 | 0.0 | 41.5 | 207.7 |
| Example 21 | 329.2 | 0.0 | 0.0 | 0.0 | 329.2 | 1,645.9 |
| Example 22 | 105.5 | 239.7 | 239.7 | 0.0 | 584.9 | 2,924.3 |
| Example 23 | 0.0 | 0.0 | 0.0 | 0.0 | 0.0 | 0.0 |
| Example 24 | 0.0 | 0.0 | 0.0 | 0.0 | 0.0 | 0.0 |
| Example 25 | 41.5 | 271.7 | 271.7 | 0.0 | 584.9 | 2,924.3 |
| Example 26 | 329.2 | 127.8 | 127.8 | 0.0 | 584.9 | 2,924.3 |
| Example 27 | 79.5 | 0.0 | 0.0 | 0.0 | 79.5 | 79.5 |
| Comparative Example 1 | 105.5 | 0.0 | 0.0 | 0.0 | 105.5 | 527.3 |

TABLE 3-2-continued

| | Mass per m² of (b1) per prepreg | | | | | |
|---|---|---|---|---|---|---|
| | Small particle diameter filler | Medium particle diameter filler | Large particle diameter filler | Extra-large particle diameter filler | Total [g/m²] | Mass of (b1) in core layer [g/m²] |
| Comparative Example 2 | 0.0 | 294.4 | 0.0 | 294.4 | 588.9 | 2,944.4 |
| Comparative Example 3 | 0.0 | 0.0 | 0.0 | 0.0 | 0.0 | 0.0 |

Table 4-1 and Table 4-2 show: the mass per m² of each of the small particle diameter filler, the medium particle diameter filler, and the large particle diameter filler in (b2) the endothermic metal hydroxide per prepreg; the total mass thereof; and the mass per m² of (b2) the endothermic metal hydroxide in the core layer.

TABLE 4-1

| | Mass per m² of (b2) per prepreg | | | | |
|---|---|---|---|---|---|
| | Small particle diameter filler | Medium particle diameter filler | Large particle diameter filler | Total [g/m²] | Mass of (b2) in core layer [g/m²] |
| Example 1 | 0.0 | 239.7 | 239.7 | 479.4 | 2,397.0 |
| Example 2 | 0.0 | 0.0 | 0.0 | 0.0 | 0.0 |
| Example 3 | 105.5 | 239.7 | 239.7 | 584.9 | 2,924.3 |
| Example 4 | 0.0 | 0.0 | 0.0 | 0.0 | 0.0 |
| Example 5 | 0.0 | 0.0 | 0.0 | 0.0 | 0.0 |
| Example 6 | 105.5 | 239.7 | 239.7 | 584.9 | 2,924.3 |
| Example 7 | 105.5 | 239.7 | 239.7 | 584.9 | 2,924.3 |
| Example 8 | 0.0 | 239.7 | 239.7 | 479.4 | 2,397.0 |
| Example 9 | 0.0 | 239.7 | 239.7 | 479.4 | 2,397.0 |
| Example 10 | 0.0 | 158.3 | 158.3 | 316.6 | 1,582.9 |
| Example 11 | 0.0 | 434.2 | 434.2 | 868.3 | 4,341.7 |
| Example 12 | 0.0 | 239.7 | 239.7 | 479.4 | 479.4 |
| Example 13 | 0.0 | 239.7 | 239.7 | 479.4 | 3,835.2 |
| Example 14 | 0.0 | 343.7 | 343.7 | 687.4 | 3,437.2 |
| Example 15 | 0.0 | 434.2 | 434.2 | 868.3 | 3,473.4 |

TABLE 4-2

| | Mass per m² of (b2) per prepreg | | | | |
|---|---|---|---|---|---|
| | Small particle diameter filler | Medium particle diameter filler | Large particle diameter filler | Total [g/m²] | Mass of (b2) in core layer [g/m²] |
| Example 16 | 0.0 | 247.2 | 247.2 | 494.3 | 2,471.5 |
| Example 17 | 0.0 | 221.9 | 221.9 | 443.7 | 2,218.6 |
| Example 18 | 0.0 | 32.0 | 447.4 | 479.4 | 2,397.0 |
| Example 19 | 0.0 | 447.4 | 32.0 | 479.4 | 2,397.0 |
| Example 20 | 0.0 | 271.7 | 271.7 | 543.3 | 2,716.6 |
| Example 21 | 0.0 | 127.8 | 127.8 | 255.7 | 1,278.4 |
| Example 22 | 0.0 | 0.0 | 0.0 | 0.0 | 0.0 |
| Example 23 | 41.5 | 271.7 | 271.7 | 584.9 | 2,924.3 |
| Example 24 | 329.2 | 127.8 | 127.8 | 584.9 | 2,924.3 |
| Example 25 | 0.0 | 0.0 | 0.0 | 0.0 | 0.0 |
| Example 26 | 0.0 | 0.0 | 0.0 | 0.0 | 0.0 |
| Example 27 | 0.0 | 180.9 | 180.9 | 361.8 | 361.8 |
| Comparative Example 1 | 0.0 | 0.0 | 479.4 | 479.4 | 2,397.0 |
| Comparative Example 2 | 0.0 | 0.0 | 0.0 | 0.0 | 0.0 |
| Comparative Example 3 | 0.0 | 422.2 | 422.2 | 844.4 | 4,222.2 |

Table 5-1 and Table 5-2 show: the mass per m² of the inorganic filler per prepreg; the mass per m² of the small particle diameter filler per prepreg; the mass per m² of the small particle diameter filler in the core layer; the mass per m² of the inorganic filler in the core layer; and the percentage of the mass of the small particle diameter filler to the mass of the inorganic filler in the core layer.

TABLE 5-1

|  | Mass per m² of inorganic filler per prepreg [g/m²] | Mass per m² of small particle diameter filler per prepreg [g/m²] | Mass of small particle diameter filler in core layer [g/m²] | Mass of filler in core layer [g/m²] | Percentage of small particle diameter filler in core layer [%] |
|---|---|---|---|---|---|
| Example 1 | 584.9 | 105.5 | 527.3 | 2,924.3 | 18.0 |
| Example 2 | 584.9 | 105.5 | 527.3 | 2,924.3 | 18.0 |
| Example 3 | 584.9 | 105.5 | 527.3 | 2,924.3 | 18.0 |
| Example 4 | 584.9 | 105.5 | 527.3 | 2,924.3 | 18.0 |
| Example 5 | 584.9 | 105.5 | 527.3 | 2,924.3 | 18.0 |
| Example 6 | 584.9 | 105.5 | 527.3 | 2,924.3 | 18.0 |
| Example 7 | 584.9 | 105.5 | 527.3 | 2,924.3 | 18.0 |
| Example 8 | 584.9 | 105.5 | 527.3 | 2,924.3 | 18.0 |
| Example 9 | 584.9 | 105.5 | 527.3 | 2,924.3 | 18.0 |
| Example 10 | 386.2 | 69.6 | 348.2 | 1,931.2 | 18.0 |
| Example 11 | 1,059.4 | 191.0 | 955.2 | 5,296.9 | 18.0 |
| Example 12 | 584.9 | 105.5 | 105.5 | 584.9 | 18.0 |
| Example 13 | 584.9 | 105.5 | 843.7 | 4,678.9 | 18.0 |
| Example 14 | 838.7 | 151.2 | 756.2 | 4,193.4 | 18.0 |
| Example 15 | 1,059.4 | 191.0 | 764.1 | 4,237.5 | 18.0 |

TABLE 5-2

|  | Mass per m² of inorganic filler per prepreg [g/m²] | Mass per m² of small particle diameter filler per prepreg [g/m²] | Mass of small particle diameter filler in core layer [g/m²] | Mass of filler in core layer [g/m²] | Percentage of small particle diameter filler in core layer [%] |
|---|---|---|---|---|---|
| Example 16 | 603.0 | 108.7 | 543.7 | 3,015.2 | 18.0 |
| Example 17 | 541.3 | 97.6 | 488.1 | 2,706.7 | 18.0 |
| Example 18 | 584.9 | 105.5 | 527.3 | 2,924.3 | 18.0 |
| Example 19 | 584.9 | 105.5 | 527.3 | 2,924.3 | 18.0 |
| Example 20 | 584.9 | 41.5 | 207.7 | 2,924.3 | 7.1 |
| Example 21 | 584.9 | 329.2 | 1,645.9 | 2,924.3 | 56.3 |
| Example 22 | 584.9 | 105.5 | 527.3 | 2,924.3 | 18.0 |
| Example 23 | 584.9 | 41.5 | 207.7 | 2,924.3 | 7.1 |
| Example 24 | 584.9 | 329.2 | 1,645.9 | 2,924.3 | 56.3 |
| Example 25 | 584.9 | 41.5 | 207.7 | 2,924.3 | 7.1 |
| Example 26 | 584.9 | 329.2 | 1,645.9 | 2,924.3 | 56.3 |
| Example 27 | 441.4 | 79.6 | 79.6 | 441.4 | 18.0 |
| Comparative Example 1 | 584.9 | 105.5 | 527.3 | 2,924.3 | 18.0 |
| Comparative Example 2 | 588.9 | 0.0 | 0.0 | 2,944.4 | 0.0 |
| Comparative Example 3 | 844.4 | 0.0 | 0.0 | 4,222.2 | 0.0 |

Table 6 shows: the mass per m² of the total solid content in the organic resin per prepreg; and the mass per unit area of the organic resin in the core layer.

TABLE 6

|  | Mass per m² of organic resin per prepreg [g/m²] | Mass of organic resin in core layer [g/m²] |
|---|---|---|
| Example 1 | 51.1 | 255.7 |
| Example 2 | 51.1 | 255.7 |
| Example 3 | 51.1 | 255.7 |
| Example 4 | 51.1 | 255.7 |
| Example 5 | 51.1 | 255.7 |
| Example 6 | 51.1 | 255.7 |
| Example 7 | 51.1 | 255.7 |
| Example 8 | 51.1 | 255.7 |
| Example 9 | 51.1 | 255.7 |
| Example 10 | 33.8 | 168.8 |
| Example 11 | 92.6 | 463.1 |
| Example 12 | 51.1 | 51.1 |
| Example 13 | 51.1 | 409.1 |
| Example 14 | 73.3 | 366.6 |
| Example 15 | 92.6 | 370.5 |
| Example 16 | 33.0 | 164.8 |
| Example 17 | 94.7 | 473.3 |
| Example 18 | 51.1 | 255.7 |

TABLE 6-continued

|  | Mass per m² of organic resin per prepreg [g/m²] | Mass of organic resin in core layer [g/m²] |
|---|---|---|
| Example 19 | 51.1 | 255.7 |
| Example 20 | 51.1 | 255.7 |
| Example 21 | 51.1 | 255.7 |
| Example 22 | 51.1 | 255.7 |
| Example 23 | 51.1 | 255.7 |
| Example 24 | 51.1 | 255.7 |
| Example 25 | 51.1 | 255.7 |
| Example 26 | 51.1 | 255.7 |
| Example 27 | 38.6 | 38.6 |
| Comparative Example 1 | 51.1 | 255.7 |
| Comparative Example 2 | 47.1 | 235.6 |
| Comparative Example 3 | 67.6 | 337.8 |

Table 7 shows evaluation results of impregnatability of the slurry into the glass fiber base material for prepreg; and thickness, adhesion, bending strength, and modulus of elasticity of the decorative laminates.

TABLE 7

|  | Impregnatability Presence/absence of aggregation | Thickness mm | Adhesion | Bending strength MPa | Modulus of elasticity GPa |
|---|---|---|---|---|---|
| Example 1 | ○ | 2.13 | ○ | 85.4 | 14.0 |
| Example 2 | ○ | 2.10 | ○ | 77.7 | 15.6 |
| Example 3 | ○ | 2.30 | ○ | 87.8 | 12.8 |
| Example 4 | ○ | 2.07 | ○ | 79.4 | 14.2 |
| Example 5 | ○ | 2.03 | ○ | 88.8 | 13.2 |
| Example 6 | ○ | 2.35 | ○ | 83.8 | 12.0 |
| Example 7 | ○ | 2.16 | ○ | 84.7 | 11.0 |
| Example 8 | ○ | 2.10 | ○ | 70.4 | 11.6 |
| Example 9 | ○ | 2.14 | ○ | 85.6 | 11.1 |
| Example 10 | ○ | 1.39 | ○ | 93.5 | 9.7 |
| Example 11 | ○ | 3.64 | ○ | 68.5 | 11.9 |
| Example 12 | ○ | 0.60 | ○ | 111.6 | 6.0 |
| Example 13 | ○ | 3.20 | ○ | 67.7 | 12.7 |
| Example 14 | ○ | 3.05 | ○ | 66.3 | 12.3 |
| Example 15 | ○ | 2.98 | ○ | 69.9 | 12.7 |
| Example 16 | ○ | 2.03 | ○ | 83.2 | 12.2 |
| Example 17 | ○ | 2.20 | ○ | 85.0 | 11.5 |
| Example 18 | ○ | 2.25 | ○ | 81.5 | 11.6 |
| Example 19 | ○ | 2.30 | ○ | 93.0 | 12.0 |
| Example 20 | ○ | 2.37 | ○ | 89.2 | 11.9 |
| Example 21 | ○ | 2.36 | ○ | 91.5 | 12.9 |
| Example 22 | ○ | 2.10 | ○ | 77.5 | 13.9 |
| Example 23 | ○ | 2.14 | ○ | 89.1 | 12.1 |
| Example 24 | ○ | 2.20 | ○ | 87.8 | 11.8 |
| Example 25 | ○ | 2.11 | ○ | 79.9 | 12.0 |
| Example 26 | ○ | 2.11 | ○ | 85.5 | 11.9 |
| Example 27 | ○ | 0.45 | ○ | 120.1 | 5.1 |
| Comparative Example 1 | ○ | 2.01 | ○ | 80.2 | 12.9 |
| Comparative Example 2 | x | 2.06 | ○ | 77.9 | 10.6 |
| Comparative Example 3 | x | 2.93 | ○ | 79.2 | 10.3 |

○: good,
x: poor

Table 8 shows evaluation results of smoothness of the decorative laminates.

TABLE 8

|  | Smoothness (waviness: longitudinal direction) | | Smoothness (waviness: transverse direction) | |
|---|---|---|---|---|
|  | Arithmetic average waviness μm | Maximum sectional height μm | Arithmetic average waviness μm | Maximum sectional height μm |
| Example 1 | 0.065 | 0.496 | 0.081 | 0.512 |
| Example 2 | 0.060 | 0.448 | 0.098 | 0.624 |
| Example 3 | 0.072 | 0.480 | 0.102 | 0.816 |
| Example 4 | 0.055 | 0.416 | 0.100 | 0.544 |
| Example 5 | 0.054 | 0.384 | 0.102 | 0.832 |
| Example 6 | 0.060 | 0.368 | 0.106 | 0.800 |
| Example 7 | 0.080 | 0.512 | 0.103 | 0.752 |
| Example 8 | 0.055 | 0.368 | 0.075 | 0.400 |
| Example 9 | 0.070 | 0.388 | 0.101 | 0.711 |
| Example 10 | 0.056 | 0.272 | 0.071 | 0.368 |
| Example 11 | 0.047 | 0.288 | 0.069 | 0.400 |
| Example 12 | 0.074 | 0.464 | 0.102 | 0.496 |
| Example 13 | 0.046 | 0.288 | 0.067 | 0.352 |
| Example 14 | 0.054 | 0.378 | 0.102 | 0.591 |
| Example 15 | 0.060 | 0.489 | 0.108 | 0.799 |
| Example 16 | 0.070 | 0.455 | 0.098 | 0.704 |
| Example 17 | 0.051 | 0.377 | 0.089 | 0.512 |
| Example 18 | 0.057 | 0.384 | 0.096 | 0.528 |
| Example 19 | 0.065 | 0.336 | 0.083 | 0.624 |
| Example 20 | 0.070 | 0.416 | 0.098 | 0.736 |
| Example 21 | 0.055 | 0.304 | 0.070 | 0.699 |
| Example 22 | 0.062 | 0.443 | 0.088 | 0.589 |
| Example 23 | 0.077 | 0.456 | 0.101 | 0.778 |
| Example 24 | 0.059 | 0.323 | 0.079 | 0.677 |
| Example 25 | 0.076 | 0.422 | 0.099 | 0.755 |
| Example 26 | 0.060 | 0.338 | 0.077 | 0.651 |
| Example 27 | 0.072 | 0.489 | 0.099 | 0.566 |
| Comparative Example 1 | 0.139 | 0.848 | 0.204 | 1.696 |
| Comparative Example 2 | 0.129 | 0.912 | 0.130 | 1.088 |
| Comparative Example 3 | 0.124 | 0.928 | 0.278 | 2.128 |

Table 9 shows evaluation results of rhodamine staining of the decorative laminates.

TABLE 9

|  | Acid solution immersion test (rhodamine staining) | | |
|---|---|---|---|
|  | Appearance after 5-minute lapse | Appearance after 10-minute lapse | Appearance after 15-minute lapse |
|  | Visual evaluation | | |
| Example 1 | ○ | ○ | ○ |
| Example 2 | ○ | ○ | ○ |
| Example 3 | ○ | ○ | ○ |
| Example 4 | ○ | ○ | ○ |
| Example 5 | ○ | ○ | ○ |
| Example 6 | ○ | ○ | ○ |
| Example 7 | ○ | ○ | ○ |
| Example 8 | ○ | ○ | ○ |
| Example 9 | ○ | ○ | ○ |
| Example 10 | ○ | ○ | ○ |
| Example 11 | ○ | ○ | ○ |
| Example 12 | ○ | ○ | ○ |
| Example 13 | ○ | ○ | ○ |
| Example 14 | ○ | ○ | ○ |
| Example 15 | ○ | ○ | ○ |
| Example 16 | ○ | ○ | ○ |
| Example 17 | ○ | ○ | ○ |
| Example 18 | ○ | ○ | ○ |
| Example 19 | ○ | ○ | ○ |
| Example 20 | ○ | ○ | ○ |
| Example 21 | ○ | ○ | ○ |
| Example 22 | ○ | ○ | ○ |
| Example 23 | ○ | ○ | ○ |
| Example 24 | ○ | ○ | ○ |
| Example 25 | ○ | ○ | ○ |

TABLE 9-continued

| | Acid solution immersion test (rhodamine staining) | | |
|---|---|---|---|
| | Appearance after 5-minute lapse | Appearance after 10-minute lapse Visual evaluation | Appearance after 15-minute lapse |
| Example 26 | ○ | ○ | ○ |
| Example 27 | ○ | ○ | ○ |
| Comparative Example 1 | ○ | ○ | x |
| Comparative Example 2 | ○ | ○ | x |
| Comparative Example 3 | ○ | ○ | x |

○: good,
x: poor

Table 10 shows evaluation results of non-combustibility of the decorative laminates.

TABLE 10

| | Non-combustibility test (10 min) | | Non-combustibility test (20 min) | |
|---|---|---|---|---|
| | Total heat release MJ/m² | Shape retention — | Total heat release MJ/m² | Shape retention — |
| Example 1 | 3.8 | ○ | 4.8 | ○ |
| Example 2 | 6.4 | ○ | 6.8 | ○ |
| Example 3 | 4.5 | ○ | 6.4 | ○ |
| Example 4 | 6.2 | ○ | 6.3 | ○ |
| Example 5 | 6.0 | ○ | 7.5 | ○ |
| Example 6 | 3.5 | ○ | 4.3 | ○ |
| Example 7 | 4.0 | ○ | 7.6 | ○ |
| Example 8 | 3.9 | ○ | 5.3 | ○ |
| Example 9 | 5.7 | ○ | 8.0 | ○ |
| Example 10 | 5.0 | ○ | 6.6 | ○ |
| Example 11 | 4.0 | ○ | 8.0 | ○ |
| Example 12 | 3.2 | ○ | 3.5 | ○ |
| Example 13 | 3.5 | ○ | 7.4 | ○ |
| Example 14 | 4.3 | ○ | 7.2 | ○ |
| Example 15 | 4.2 | ○ | 7.0 | ○ |
| Example 16 | 3.2 | ○ | 4.3 | ○ |
| Example 17 | 5.8 | ○ | 7.9 | ○ |
| Example 18 | 3.2 | ○ | 5.5 | ○ |
| Example 19 | 3.5 | ○ | 4.9 | ○ |
| Example 20 | 3.6 | ○ | 4.5 | ○ |

TABLE 10-continued

| | Non-combustibility test (10 min) | | Non-combustibility test (20 min) | |
|---|---|---|---|---|
| | Total heat release MJ/m² | Shape retention — | Total heat release MJ/m² | Shape retention — |
| Example 21 | 3.4 | ○ | 6.5 | ○ |
| Example 22 | 6.4 | ○ | 6.9 | ○ |
| Example 23 | 3.7 | ○ | 6.4 | ○ |
| Example 24 | 3.4 | ○ | 6.0 | ○ |
| Example 25 | 4.5 | ○ | 7.2 | ○ |
| Example 26 | 4.4 | ○ | 7.1 | ○ |
| Example 27 | 3.0 | ○ | 3.3 | ○ |
| Comparative Example 1 | 3.8 | ○ | 4.5 | ○ |
| Comparative Example 2 | 8.4 x | ○ | 10.8 x | ○ |
| Comparative Example 3 | 6.0 | ○ | 7.9 | ○ |

○: good,
x: poor

Table 11 shows the volume cumulative particle diameter and the specific surface area of the inorganic filler.

TABLE 11

| | Volume cumulative particle diameter | | | Specific surface area m²/kg |
|---|---|---|---|---|
| | Dv(10) [µm] | Dv(50) [µm] | Dv(90) [µm] | |
| Example 2 | 1.48 | 10.6 | 36 | 1612 |
| Example 3 | 1.53 | 10.7 | 30.9 | 1510 |
| Example 8 | 2.49 | 12.6 | 31.8 | 991.1 |
| Example 23 | 2.5 | 13.6 | 36.6 | 980 |
| Example 24 | 0.78 | 3.48 | 25.9 | 2973 |
| Example 25 | 1.84 | 12.8 | 30.6 | 1322 |
| Example 26 | 1.12 | 5.72 | 31 | 2072 |

Table 12 shows the first average particle diameter of the small particle diameter filler, the second average particle diameter of the medium particle diameter filler, the third average particle diameter of the large particle diameter filler, and the average particle diameter of the extra-large particle diameter filler.

TABLE 12

| | First average particle diameter (small particle diameter filler) 0.04 µm or more and less than 4 µm | Second average particle diameter (medium particle diameter filler) 4 µm or more and less than 12 µm | Third average particle diameter (large particle diameter filler) 12 µm or more and less than 50 µm | Extra-large particle diameter filler 50 µm or more |
|---|---|---|---|---|
| Example 1 | 1.4 | 8 | 20 | |
| Example 2 | 1.4 | 8 | 17 | |
| Example 3 | 1 | 8 | 20 | |
| Example 4 | 1.4 | 8 | 17 | |
| Example 5 | 1.4 | 8 | 17 | |
| Example 6 | 1 | 8 | 20 | |
| Example 7 | 1 | 8 | 20 | |
| Example 8 | 1.4 | 8 | 20 | |
| Example 9 | 1.4 | 8 | 20 | |
| Example 10 | 1.4 | 8 | 20 | |
| Example 11 | 1.4 | 8 | 20 | |
| Example 12 | 1.4 | 8 | 20 | |
| Example 13 | 1.4 | 8 | 20 | |
| Example 14 | 1.4 | 8 | 20 | |
| Example 15 | 1.4 | 8 | 20 | |
| Example 16 | 1.4 | 8 | 20 | |
| Example 17 | 1.4 | 8 | 20 | |
| Example 18 | 1.4 | 8 | 20 | |

TABLE 12-continued

| | First average particle diameter (small particle diameter filler) 0.04 μm or more and less than 4 μm | Second average particle diameter (medium particle diameter filler) 4 μm or more and less than 12 μm | Third average particle diameter (large particle diameter filler) 12 μm or more and less than 50 μm | Extra-large particle diameter filler 50 μm or more |
|---|---|---|---|---|
| Example 19 | 1.4 | 8 | 20 | |
| Example 20 | 1.4 | 8 | 20 | |
| Example 21 | 1.4 | 8 | 20 | |
| Example 22 | 1.4 | 8 | 15 | |
| Example 23 | 1 | 8 | 20 | |
| Example 24 | 1 | 8 | 20 | |
| Example 25 | 1.4 | 8 | 17 | |
| Example 26 | 1.4 | 8 | 17 | |
| Example 27 | 1.4 | 8 | 20 | |
| Comparative Example 1 | 1.8 (Calcium carbonate) | — | 12 (Aluminum hydroxide) | |
| Comparative Example 2 | — | 10 (Calcium carbonate) | — | 80 (Calcium carbonate) |
| Comparative Example 3 | | 8 (Aluminum hydroxide) | 20 (Aluminum hydroxide) | |

Test methods were as described below.

(1) Impregnatability

A case where the slurry could be impregnated into the glass fiber base material for prepreg at an intended impregnation rate stably for a long time was evaluated as good. A case where aggregation occurred to fail to control the amount of impregnation was evaluated as poor.

(2) Thickness

The thickness of the decorative laminate was measured with a micrometer.

(3) Adhesion

A boiling resistance test was performed on the decorative laminate according to the "testing method for laminated thermosetting resin high-pressure decorative laminates" of JIS K 6902:2007. A case where no bulging or delamination occurred was evaluated as good.

(4) Bending strength/Modulus of elasticity

The bending strength and modulus of elasticity of the decorative laminate were measured according to "Plastics—How to determine flexural properties" of JIS K 7171:2016. The testing machine used was that manufactured by Shimadzu Corporation (Product No.: Autograph AG-20 kN/50 kN ISD MS). The test surface was a surface perpendicular to the fiber direction of the decorative laminate. The unit of the bending strength is MPa, and the unit of the modulus of elasticity is GPa.

(5) Smoothness (Waviness: Longitudinal Direction)

(5)-1. Arithmetic Average Waviness Wa

The arithmetic average waviness Wa refers to an arithmetic average waviness of the waviness curve. The arithmetic average waviness Wa of the decorative laminate was measured in the fiber direction of the decorative laminate, according to the "Geometric properties specification (GPS) of products—surface texture: contour curve method—terms, definitions, and surface texture parameters" of JIS B 0601:2013, using a surface roughness shape measuring machine (manufactured by Tokyo Seimitsu Co., Ltd., Model No.: SURFCOM FLEX-50A). The lower the numerical value of Wa is, the smoother the decorative laminate was and the less the decorative laminate was affected by unevenness of the base material. The unit is μm.

(5)-2. Maximum Sectional Height Wt

The maximum sectional height Wt refers to the maximum sectional height of the waviness curve. The maximum sectional height Wt of the decorative laminate was measured in the fiber direction of the decorative laminate, according to "Geometric properties specification (GPS) of products—surface texture: contour curve method—terms, definitions, and surface texture parameters" of JIS B 0601:2013, using the surface roughness shape measuring machine (manufactured by Tokyo Seimitsu Co., Ltd., Model No.: SURFCOM FLEX-50A). The sum of the maximum value of the peak height Wp and the maximum value of the valley depth Wv in the waviness curve through the evaluation length of the decorative laminate was calculated, and the calculated value was taken as the maximum sectional height Wt. The lower the numerical value of the maximum sectional height Wt is, the smoother the decorative laminate was and the less the decorative laminate was affected by unevenness of the base material. The evaluation length was 20 mm. The unit is μm.

(6) Smoothness (Waviness: Transverse Direction)

A similar measurement to the above item (5) was performed in a direction perpendicular to the fiber direction of the decorative laminate.

(7) Acid Solution Immersion Test (Rhodamine Staining Test)

3 g of rhodamine B and 100 ml of methanol were added to 1300 g of 1% hydrochloric acid to prepare rhodamine solution. The decorative laminate was cut into a size of 150 mm×50 mm, and the cut decorative laminate was immersed in the rhodamine solution at 50° C. for a specified time period (5 min, 10 min, and 15 min). The decorative laminate was washed with water and wiped dry, and then presence/absence of erosion by hydrochloric acid and staining with the rhodamine solution on the decorative laminate was confirmed. A case where neither erosion by hydrochloric acid nor staining with the rhodamine solution was observed was evaluated as good. A case where erosion by hydrochloric acid and/or staining with the rhodamine solution were observed was evaluated as poor. No differences were observed between the decorative laminates of Examples 1 to 27 and the decorative laminates of Comparative Examples 1 to 3 when they were immersed for 5 minutes and for 10 minutes, whereas differences were observed when they were immersed for 15 minutes.

Figure 2:
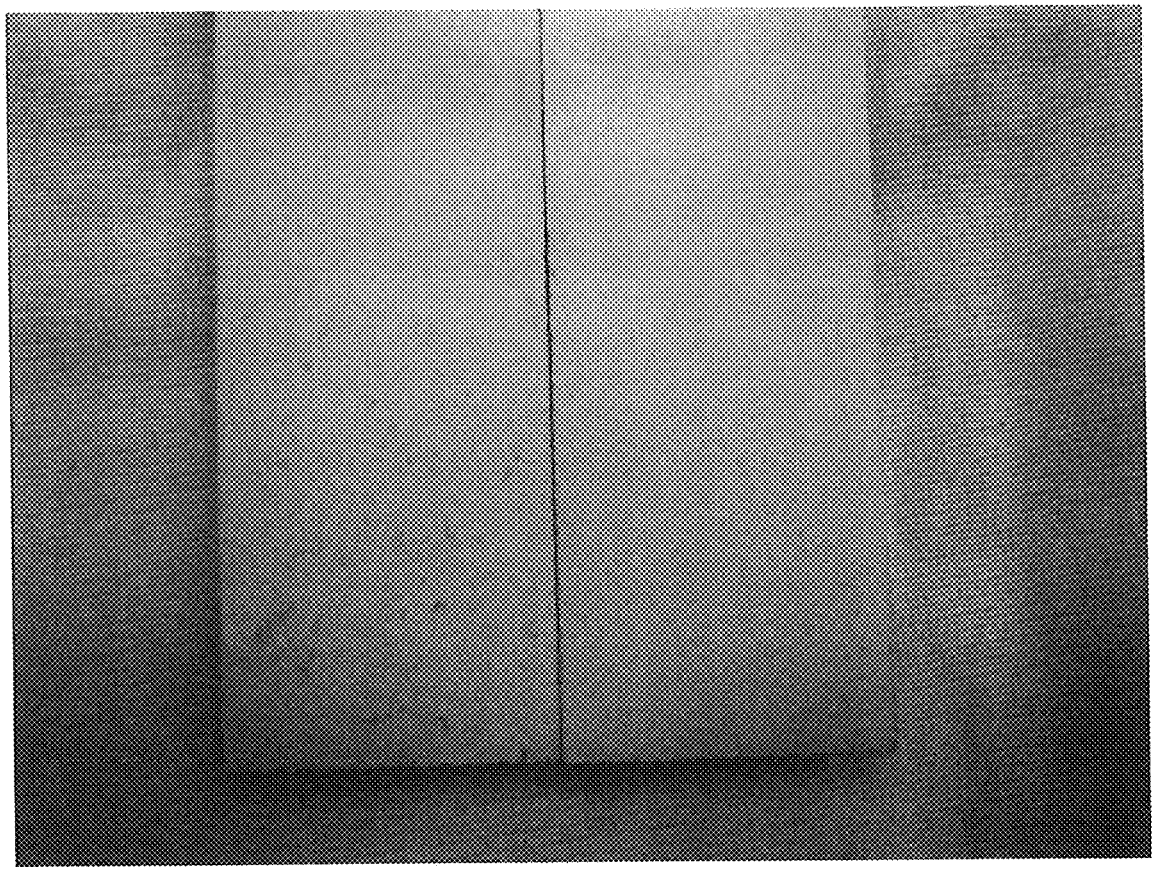
FIG. 2 is a photograph of the decorative laminate of Example 1 of the present disclosure (right side) and a decorative laminate of Comparative Example 1 (left side), each having been subjected to a 15-minute acid solution immersion test.

The above-described acid solution immersion test was performed on the decorative laminates of Example 1 and Comparative Example 1, and the decorative laminates were photographed after the 15-minute immersion test. The decorative laminate of Example 1 is shown on the right side of FIG. 2, and the decorative laminate of Comparative Example 1 is shown on the left side of FIG. 2. Staining was not observed on the decorative laminate of Example 1. On the other hand, staining was observed on the decorative laminate of Comparative Example 1. It was easy to wipe the rhodamine solution off the decorative laminate of Example 1 after the test. On the other hand, the rhodamine solution could not be wiped off the decorative laminate of Comparative Example 1 and remained slightly. From these results, it was found that the surface of the decorative laminate of Example 1 was smoother.

(8) Non-Combustibility Test (10 Min)

A 10-minute heat release test using a cone calorimeter according to ISO 5660 was performed on the decorative laminate. As an evaluation method, evaluated as good was a case where the total heat release of the decorative laminate was 8 $MJ/m^2$ or less, the maximum heat release rate of the decorative laminate was continuously less than 200 $kW/m^2$ for 10 seconds or longer, and the decorative laminate after the test had no fracture, crack, or the like penetrating to the back side. A case where at least one of the three conditions was not satisfied was evaluated as poor.

(9) Non-Combustibility Test (20 Min)

A 20-minute heat release test using a cone calorimeter according to ISO 5660 was performed on the decorative laminate. As an evaluation method, evaluated as good was a case where the total heat release of the decorative laminate was 8 $MJ/m^2$ or less, the maximum heat release rate of the decorative laminate was continuously less than 200 $kW/m^2$ for 10 seconds or longer, and the decorative laminate after the test had no fracture, crack, or the like penetrating to the back side. A case where at least one of the three conditions was not satisfied was evaluated as poor.

(10) Volume Cumulative Particle Diameter (B) the inorganic filler was measured with a laser diffraction type particle size distribution measuring device (manufactured by Malvern Instruments Ltd., Model No.: Mastersizer 3000).

As shown in the evaluation results of impregnatability, in Examples 1 to 27 and Comparative Example 1, the slurry could be impregnated into the glass fiber base material for prepreg stably for a long time. However, in the prepreg of Comparative Example 2, the calcium carbonate having a large particle diameter aggregated to cause unevenness on the prepreg, and impregnatability of the slurry was inferior in terms of stability with time. In the prepreg of Comparative Example 3, the aluminum hydroxide having a large particle diameter, which was blended in a large amount, aggregated to cause unevenness on the prepreg, and impregnatability of the slurry was inferior in terms of stability with time.

The prepregs of Example 1 and Comparative Example 1 were photographed by a digital microscope (manufactured by Fujidenshi Corp., Model No.: FTG40, at a magnification of ×10). FIG. 3 shows the prepreg of Example 1, and FIG. 4 shows the prepreg of Comparative Example 1. As seen from FIG. 3, the prepreg of Example 1 was excellent in smoothness, whereas the prepreg of Comparative Example 1 was uneven and aggregates of the inorganic filler were observed.

As for smoothness of the decorative laminate, both in the longitudinal direction and in the transverse direction, the arithmetic average waviness Wa and the maximum sectional height Wt in each of Examples 1 to 27 are both smaller than those in each of Comparative Examples 1 to 3. That is, the decorative laminates of Examples 1 to 27 were more excellent in smoothness.

As for the acid solution immersion test (rhodamine staining), the decorative laminates of Examples 1 to 27 were not stained because of their smoothness, thus achieving a successful level. On the other hand, in Comparative Examples 1 to 3, differences from Examples 1 to 27 emerged after the 15-minute immersion test. Specifically, when the decorative laminate was washed with water, the rhodamine solution could not be removed because it adheres to the decorative laminate. This is considered to have been caused as follows. The surface of the prepreg had unevenness, and curing of the thermosetting resin in concave portions thereon was insufficient during hot pressing, and thus curing of the thermosetting resin in the concave portions was also insufficient in the state of the decorative laminate, thus causing progression of erosion by hydrochloric acid in the concave portions.

As for non-combustibility, the decorative laminates of Examples 1 to 27 achieved a successful level in the non-combustibility test (20 min). Even the decorative laminates of Examples 2, 4, 5, 22, 25, and 26, in which endothermic hydroxide was not used, also achieved a successful level. In Comparative Example 2, the prepreg was impregnated non-uniformly, and thus, the organic resin component appeared on the surface during the test, resulting in the total heat release exceeding 8 $MJ/m^2$.

REFERENCE SIGNS LIST

1 decorative layer
2 prepreg
3 core layer
5 decorative laminate

What is claimed is:

1. A decorative laminate formed by pressing a decorative layer and a core layer together under heat, the decorative layer comprising:
    a decorative paper; and
    a thermosetting resin,
    the core layer comprising a prepreg,
    the prepreg comprising:
        a fibrous base material; and
        a slurry comprising:
            an organic resin component; and
            an inorganic filler comprising:
                endothermic metal hydroxide; and/or
                an inorganic substance other than the endothermic metal hydroxide,
    the fibrous base material being a nonwoven fabric having entangled fibers with voids including a thermoplastic resin emulsion as a binder component,
    the slurry being impregnated into the fibrous base material,
    an average particle diameter of the inorganic filler being 0.04 µm or more and less than 50 µm,
    the inorganic filler comprising:
        a small particle diameter filler having a first average particle diameter;
        a medium particle diameter filler having a second average particle diameter larger than the first average particle diameter; and
        a large particle diameter filler having a third average particle diameter larger than the second average particle diameter, and
    the first average particle diameter of the small particle diameter filler being 0.04 µm or more and less than 4 µm, the second average particle diameter of the medium particle diameter filler being 4 µm or more and less than 12 µm, and the third average particle diameter of the large particle diameter filler being 12 µm or more and less than 50 µm;

wherein a blending mass ratio of the small particle diameter filler to the medium particle diameter filler to the large particle diameter filler in the core layer is 1:0.1-20:0.1-20; and wherein, in the core layer, the small particle diameter filler, the medium particle diameter filler, and the large particle diameter filler fill voids formed between fibers of the fibrous base material, such that an arithmetic average waviness Wa in a waviness curve in a longitudinal direction is 0.02 to 0.11 µm, and an arithmetic average waviness Wa in a waviness curve in a transverse direction is 0.03 to 0.12 µm, as measured according to JIS B 0601:2013, due to weakening in binding of said entangled fibers and filling of said voids with said inorganic filler having said small particle diameter, medium particle diameter and large particle diameter, when said decorative laminate is formed by said heat pressing of said decorative layer and said core layer with softening of said thermoplastic resin emulsion binder.

2. The decorative laminate according to claim 1, wherein a blending ratio of the organic resin component to the inorganic filler in the core layer by solid weight is 1:1-25.

3. The decorative laminate according to claim 1, wherein, as measured according to JIS B 0601:2013, a maximum sectional height Wt in the waviness curve in the longitudinal direction is 0.1 to 0.8 µm, and a maximum sectional height Wt in the waviness curve in the transverse direction is 0.1 to 1.0 µm.

4. The decorative laminate according to claim 1, wherein the small particle diameter filler is calcium carbonate.

5. The decorative laminate according to claim 1, wherein the inorganic substance other than the endothermic metal hydroxide is calcium carbonate or talc.

6. The decorative laminate according to claim 1, wherein the endothermic metal hydroxide is aluminum hydroxide.

7. The decorative laminate according to claim 1, wherein a mass per unit area of the inorganic filler contained in the core layer is 441.4 to 5296.9 g/m$^2$.

8. The decorative laminate according to claim 1, wherein a percentage of the small particle diameter filler in the inorganic filler contained in the core layer is 5 to 60% by weight.

9. The decorative laminate according to claim 1, wherein a mass per unit area of the organic resin component contained in the core layer is 38.6 to 473.3 g/m$^2$.

10. The decorative laminate according to claim 1, wherein the organic resin component comprises a thermosetting resin.

11. The decorative laminate according to claim 10, wherein the thermosetting resin comprises a condensation-type thermosetting resin.

12. The decorative laminate according to claim 11, wherein the condensation-type thermosetting resin is at least one selected from among amino-aldehyde resins and phenol-aldehyde resins.

13. The decorative laminate according to claim 1, the decorative laminate being a non-combustible decorative laminate.

14. The decorative laminate according to claim 1, wherein the fibrous base material comprises an inorganic fiber base material.

15. The decorative laminate according to claim 1, wherein, as measured by a laser diffraction/scattering-type particle size distribution measurement method, volume cumulative particle diameters Dv(10) and Dv(90) of the inorganic filler are 0.2 µm or more and 45.0 µm or less.

16. The decorative laminate according to claim 1, wherein, as measured by a laser diffraction/scattering-type particle size distribution measurement method, a specific surface area of the inorganic filler is 800 to 4000 m$^2$/kg.

* * * * *